United States Patent
Rahimi et al.

(10) Patent No.: US 11,069,069 B2
(45) Date of Patent: Jul. 20, 2021

(54) SYSTEM FOR PREDICTING MOVEMENTS OF AN OBJECT OF INTEREST WITH AN AUTOENCODER

(71) Applicant: HRL Laboratories, LLC, Malibu, CA (US)

(72) Inventors: Amir M. Rahimi, Malibu, CA (US); Soheil Kolouri, Calabasas, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 20 days.

(21) Appl. No.: 15/949,013

(22) Filed: Apr. 9, 2018

(65) Prior Publication Data

US 2018/0293736 A1    Oct. 11, 2018

Related U.S. Application Data

(60) Provisional application No. 62/483,916, filed on Apr. 10, 2017, provisional application No. 62/649,893, filed on Mar. 29, 2018.

(51) Int. Cl.
*G06T 7/20* (2017.01)
*H04N 19/537* (2014.01)
(Continued)

(52) U.S. Cl.
CPC ............ *G06T 7/20* (2013.01); *G06K 9/00724* (2013.01); *G06K 9/4628* (2013.01);
(Continued)

(58) Field of Classification Search
CPC ............ G06T 7/20; G06T 2207/20081; G06T 2207/30241; H04N 19/537; G06K 9/00724; G06K 9/4628; G06K 9/6247
See application file for complete search history.

(56) References Cited

U.S. PATENT DOCUMENTS 7,864,980 B2 * 1/2011 Evans ................ G06K 9/00771
348/154
10,115,032 B2 * 10/2018 Chandraker ....... G06K 9/00201
(Continued)

FOREIGN PATENT DOCUMENTS

WO    WO2016-025887 A2    2/2016
WO    WO 2016/157152 A1    10/2016

OTHER PUBLICATIONS

"An Uncertain Future: Forecasting from Static Images using Variational Autoencoders", arXiv:1606.07873v1 [cs.CV] Jun. 25, 2016, Walker et al. (hereinafter Walker).*
(Continued)

*Primary Examiner* — Qun Shen
(74) *Attorney, Agent, or Firm* — Tope-McKay & Associates

(57) ABSTRACT

Described is a system for implicitly predicting movement of an object. In an aspect, the system includes one or more processors and a memory, the memory being a non-transitory computer-readable medium having executable instructions encoded thereon, such that upon execution of the instructions, the one or more processors perform operations of providing an image of a first trajectory to a predictive autoencoder, and using the predictive autoencoder, generating a predicted tactical response that comprises a second trajectory based on images of previous tactical responses that were used to train the predictive autoencoder, and controlling a device based on the predicted tactical response.

22 Claims, 8 Drawing Sheets

(51) Int. Cl.
*G06K 9/00* (2006.01)
*G06K 9/46* (2006.01)
*G06K 9/62* (2006.01)

(52) U.S. Cl.
CPC ......... *H04N 19/537* (2014.11); *G06K 9/6247* (2013.01); *G06T 2207/20081* (2013.01); *G06T 2207/30241* (2013.01)

(56) References Cited

U.S. PATENT DOCUMENTS

| | | | | |
|---|---|---|---|---|
| 10,229,322 | B2* | 3/2019 | Fridental | G06K 9/6262 |
| 10,402,653 | B2* | 9/2019 | Min | G06N 3/0454 |
| 10,572,735 | B2* | 2/2020 | Han | G06K 9/00724 |
| 2012/0316843 | A1* | 12/2012 | Beno | G06Q 10/0639 703/2 |
| 2013/0178304 | A1 | 7/2013 | Chan | |
| 2013/0266174 | A1* | 10/2013 | Bleiweiss | G06K 9/00355 382/103 |
| 2015/0363644 | A1 | 12/2015 | Wnuk et al. | |
| 2016/0092769 | A1* | 3/2016 | Lucey | G06N 7/005 706/47 |
| 2018/0348250 | A1* | 12/2018 | Higgins | G01P 5/00 |

OTHER PUBLICATIONS

Lucey, Patrick, et al. "Representing and discovering adversarial team behaviors using player roles." Proceedings of the IEEE Conference on Computer Vision and Pattern Recognition. 2013, pp. 2704-2713.

Ali, Saad, and Mubarak Shah. "Floor fields for tracking in high density crowd scenes." European conference on computer vision. Springer Berlin Heidelberg, 2008, pp. 1-14.

Pellegrini, Stefano, et al. "You'll never walk alone: Modeling social behavior for multi-target tracking." 2009 IEEE 12th International Conference on Computer Vision. IEEE, 2009, pp. 261-268.

Bialkowski, Alina, et al. "Recognizing team activities from noisy data." Proceedings of the IEEE Conference on Computer Vision and Pattern Recognition Workshops. 2013, pp. 984-990.

Bialkowski, Alina, et al. "Person re-identification using group information." International Conference on Digital Image Computing, Techniques and Applications (DICTA), IEEE, 2013, pp. 1-6.

Intille, Stephen S., and Aaron F. Bobick. "A framework for recognizing multi-agent action from visual evidence." AAAI/IAAI 99 (1999): pp. 518-525.

Li, Ruonan, Rama Chellappa, and Shaohua Kevin Zhou. "Learning multi-modal densities on discriminative temporal interaction manifold for group activity recognition." Computer Vision and Pattern Recognition, 2009. CVPR 2009. IEEE Conference on. IEEE, 2009, pp. 2450-2457.

Li, Ruonan, and Rama Chellappa. "Group motion segmentation using a spatio-temporal driving force model." Computer Vision and Pattern Recognition (CVPR), Conference on., IEEE, 2010, pp. 2038-2045.

Tran, Du, and Junsong Yuan. "Optimal spatio-temporal path discovery for video event detection." IEEE Conference on Computer Vision and Pattern Recognition (CVPR), IEEE, 2011, pp. 3321-3328.

Wang, Xinchao, et al. "Tracking interacting objects optimally using integer programming." European Conference on Computer Vision. Springer International Publishing, 2014, pp. 17-32.

Bialkowski, Alina, et al. "Win at home and draw away: automatic formation analysis highlighting the differences in home and away team behaviors." Proceedings of 8th Annual MIT Sloan Sports Analytics Conference. 2014, pp. 1-7.

Hardoon, David R., Sandor Szedmak, and John Shawe-Taylor. "Canonical correlation analysis: An overview with application to learning methods." Neural computation 16.12 (2004): pp. 2639-2664.

Kim, Kihwan, et al. "Motion fields to predict play evolution in dynamic sport scenes." Conference on Computer Vision and Pattern Recognition (CVPR), IEEE, 2010, pp. 840-847.

Kingma, D.P. and Welling, M., Auto-Encoding Variational Bayes, ArXiv e-prints, arxiv.org/abs/1312.6114, arXiv:1312.6114v10 [stat. ML], May 1, 2014, pp. 1-14.

Caliński, T., & Harabasz, J. "A dendrite method for cluster analysis". Communications in Statistics-theory and Methods 3: pp. 1-27 (1974).

Vincent, Pascal; Larochelle, Hugo; Lajoie, Isabelle; Bengio, Yoshua; Manzagol, Pierre-Antoine (2010). "Stacked Denoising Autoencoders: Learning Useful Representations in a Deep Network with a Local Denoising Criterion". The Journal of Machine Learning Research. 11: pp. 3371-3408.

Notification of Transmittal of International Search Report and the Written Opinion of the International Searching Authority for PCT/US2018/026770; dated Jul. 17, 2018.

International Search Report of the International Searching Authority for PCT/US2018/026770; dated Jul. 17, 2018.

Written Opinion of the International Searching Authority for PCT/US2018/026770; dated Jul. 17, 2018.

International Preliminary Report on Patentability for PCT/US2018/026770; dated Mar. 25, 2019.

Communication pursuant to Rules 70(2) and 70a(2) EPC and the extended European Search Report for the European Regional Phase Patent Application No. 18784088.9, dated Dec. 3, 2020.

Stephen Zheng, et A L: "Generating Long-term Trajectories Using Deep Hierarchical Networks", NIPS'16: Proceedings of the 30th international conference on neural information processing systems, Dec. 5, 2016 (Dec. 5, 2016) pp. 1551-1559, XP55753910, Retrieved from the Internet: URL:https://dl.acm.orgjdoi/pdf/10.5555/3157096. 3157270 [retrieved on Nov. 25, 2020].

Hasan Mahmudul, et al: "Learning Temporal Regularity in Video Sequences", 2016 IEEE Conference on Computer Vision and Pattern Recognition (CVPR). IEEE. Jun. 27, 2016 (Jun. 27, 2016). pp. 733-742. XP033021250. DOI: 10.1109/CVPR.2016.86 [retrieved on Dec. 9, 2016].

Mark Harmon, et al: "Predicting Shot Making in Basketball using Convolutional Neural Networks Learnt from Adversarial Multiagent Trajectories", arxiv.org. Cornell University Library. 201 OLIN Library Cornell University Ithaca. NY 14853. Sep. 15, 2016 (Sep. 15, 2016). XP080727023.

Liu Hailong, et al: "Visualization of driving behavior using deep sparse autoencoder", 2014 IEEE Intelligent Vehicles Symposium Proceedings. IEEE. Jun. 8, 2014 (Jun. 8, 2014). pp. 1427-1434. XP032620298. DOI: 10.1109/IVS.2014.6856506 [retrieved on Jul. 15, 2014].

Kuan-Chieh Wang, et al: "Classifying NBA Offensive Plays Using Neural Networks". Research Papers Competition. MIT sloan sports analytics conference Mar. 11-12, 2016. Jan. 1, 2016 (Jan. 1, 2016). XP55753921. Retrieved from the Internet: URL:http://www.cs.toronto.eduj-zemeljdocum ents/1536-Classifying-NBA-OffensivePlaysUsing-Neural-Networks.pdf [retrieved on Nov. 25, 2020].

Felsen Panna ,et al: "What will Happen Next? Forecasting Player Moves in Sports Videos". 2017 IEEE International Conference on Computer Vision (?CCV). IEEE. Oct. 22, 2017 (Oct. 22, 2017). pp. 3362-3371. XP033283205. DOI: 10.1109/ICCV.2017.362 [retrieved on Dec. 22, 2017].

Ivanovic Boris, et al: "Generative Modeling of Multimodal Multi-Human Behavior". 2018 IEEE/RSJ International Conference on Intelligent Robots and Systems (IROS). IEEE. Oct. 1, 2018 (Oct. 1, 2018). pp. 3088-3095. XP033491662. DOI: 10.1109/IROS.2018. 8594393 [retrieved on Dec. 27, 2018].

* cited by examiner

Algorithm 1 Implicit Tactical Analysis in Basketball

Input: Positions $x_k$, $y_k$, $x_{ball}$, $y_{ball}$
where $k \in \{player_1, ..., player_5\}$
Output: Autoencoder Parameters
for all events n do
    1. Generate the trajectory images $I_n$, $J_n$:
        – Create an image $I_n$, $J_n$ with aspect ratio of the basketball court
        – Draw the trajectory of the ball
        – Draw the trajectory of lines connecting the players and the ball 2. Autoencoders:
        Compute the transitions $\phi$ and $\psi$ such that:
        $f : I \rightarrow F$ and $\phi : F \rightarrow J$
        $err = \mathrm{argmin} \, \| I - (\phi \circ f) J \|^2$

Tactical Analysis with Autoencoders:
Once the network is trained with the objective of minimizing the reconstruction error, we can simply feed in the an input image $\hat{i}$ and construct the opposing team's reaction $\hat{j}$ in image domain

FIG. 4

SYSTEM FOR PREDICTING MOVEMENTS OF AN OBJECT OF INTEREST WITH AN AUTOENCODER

CROSS-REFERENCE TO RELATED APPLICATIONS

This application claims the benefit of and is a non-provisional patent application of U.S. provisional application No. 62/483,916, filed on Apr. 10, 2017, the entirety of which is hereby incorporated by reference.

This application ALSO claims the benefit of and is a non-provisional patent application of U.S. provisional application No. 62/649,893, filed on Mar. 29, 2018, the entirety of which is hereby incorporated by reference.

BACKGROUND OF INVENTION

Field of Invention

The present invention relates to prediction of movements and, more specifically, to a system for implicit prediction of movements of an object of interest with an autoencoder.

Description of Related Art

For some adversarial, competitive, or other activities, rapid or real-time tactical information regarding movement could be useful for improving performance of a team, object, or individual. Such high level analyses are typically complex. For example, in a sporting context, team performance typically relies heavily on the skill set of coaches who can oversee the game from a wide perspective. Systems to predict adversarial or other motion-related behavior may thus be of assistance to coaches, players, spectators, and/or others.

Conventional systems have attempted to understand certain aspects of prediction of adversarial behavior, such as in sports. These aspects may include team behavior, player trajectories, group motion, player interaction, and formation analysis. However, each of the references below use simplifying assumptions that eliminate an important part of "tactical" behavior.

For example, Lucey et al. (see the List of Incorporated Literature References, Literature Reference No. 1) proposed a role-based representation in order to better understand the team behavior. Their approach can reduce the problem of high permutation in player movements.

In another approach, Intille et al. (see Literature Reference No. 6) modeled the interactions between player trajectories using a Bayesian network.

Multi-modal density function was used in Li et al. (see Literature Reference No. 7) to classify different offensive plays. In Li et al. (see Literature Reference No. 8), the authors segmented the group motion and used a spatio-temporal driving force model to identify offensive plays in American football.

In a sports setting, such as soccer, Kim et al. (see Literature Reference No. 13) estimated the global movement of the players using a dense motion field. They then looked for convergence of these motion fields to indicate the key events.

Wang et al. (see Literature Reference No. 10) formulated a network-flow to track all players simultaneously by considering interactions between players.

Formation analysis was used in Bialkowski et al. (see Literature Reference No. 11) to compare the performance of a team playing at home or away from home.

While the aforementioned techniques are somewhat operable, they each use simplifying assumptions that eliminate an important part of "tactical" behavior. Given the limitations of each of these conventional systems, a continuing need exists for a system that also considers certain parts of tactical behavior.

SUMMARY OF INVENTION

This disclosure provides a system for implicitly predicting movement of an object. In various embodiments, the system includes one or more processors and a memory. The memory is a non-transitory computer-readable medium having executable instructions encoded thereon, such that upon execution of the instructions, the one or more processors perform operations including providing an image of a first trajectory to a predictive autoencoder; using the predictive autoencoder, generating a predicted tactical response that comprises a second trajectory based on images of previous tactical responses that were used to train the predictive autoencoder; and controlling a device based on the predicted tactical response.

In another aspect, the first trajectory is for a first object that comprises one of a person or a vehicle.

In yet another aspect, the first trajectory is for a first team comprising two or more members.

In yet another aspect, the predictive autoencoder comprises a convolutional neural network.

In yet another aspect, the convolutional neural network comprises an encoder part of a first team autoencoder and a decoder part of a second team autoencoder.

In yet another aspect, the one or more processors further perform operations of jointly training the first team autoencoder and the second team autoencoder by minimizing an objective function.

In yet another aspect, the one or more processors perform operations of training the predictive autoencoder by providing the predictive autoencoder with data that includes multiple events. Each event includes an image of a first team trajectory that occurred during the event and an image of a second team trajectory that occurred during the event.

In yet another aspect, the device comprises a display.

In yet another aspect, the device comprises at least one of a drone, a vehicle, and a motor.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 is an illustration of an Autoencoder algorithm used for predicting a response for adversarial movements, according to various embodiments;

DETAILED DESCRIPTION

Figure 1:
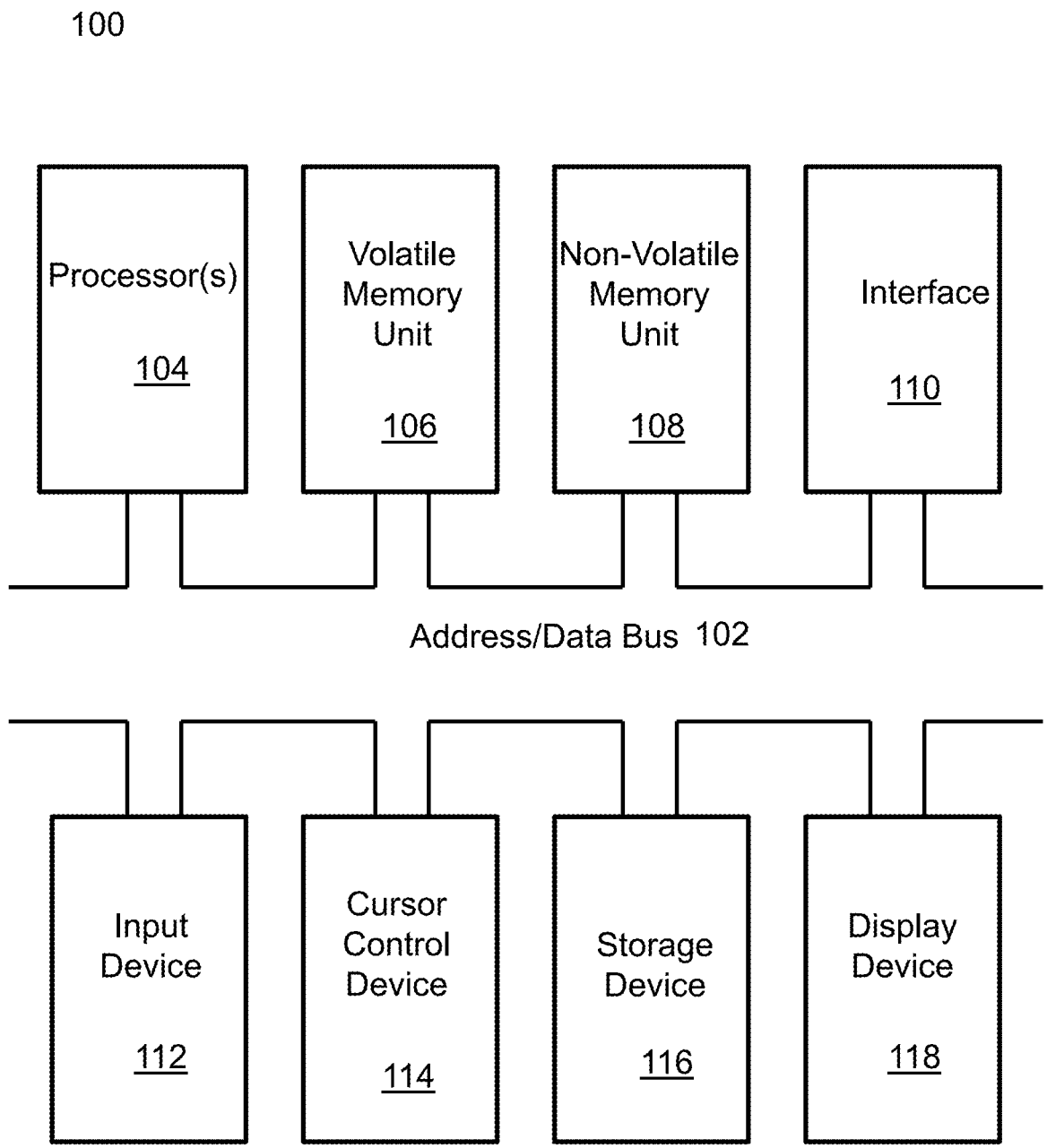
FIG. 1 is a block diagram depicting the components of a system according to various embodiments of the present invention.

The present invention relates to prediction of movements and, more specifically, to system for implicit prediction of movements of an object with an autoencoder.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided as a central resource for the reader. Next, a description of the various principal aspects of the present invention is provided. Subsequently, an introduction provides the reader with a general understanding of the present invention. Finally, specific details of various embodiments of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Lucey, Patrick, et al. "Representing and discovering adversarial team behaviors using player roles." Proceedings of the IEEE Conference on Computer Vision and Pattern Recognition. 2013.
2. Ali, Saad, and Mubarak Shah. "Floor fields for tracking in high density crowd scenes." European conference on computer vision. Springer Berlin Heidelberg, 2008.
3. Pellegrini, Stefano, et al. "You'll never walk alone: Modeling social behavior for multi-target tracking." 2009 IEEE 12th International Conference on Computer Vision. IEEE, 2009.
4. Bialkowski, Alina, et al. "Recognizing team activities from noisy data." Proceedings of the IEEE Conference on Computer Vision and Pattern Recognition Workshops. 2013.
5. Bialkowski, Alina, et al. "Person re-identification using group information." Digital Image Computing: Techniques and Applications (DICTA), 2013 International Conference on. IEEE, 2013
6. Intille, Stephen S., and Aaron F. Bobick. "A framework for recognizing multi-agent action from visual evidence." AAAI/IAAI 99 (1999): 518-525.
7. Li, Ruonan, Rama Chellappa, and Shaohua Kevin Zhou. "Learning multi-modal densities on discriminative temporal interaction manifold for group activity recognition." Computer Vision and Pattern Recognition, 2009. CVPR 2009. IEEE Conference on. IEEE, 2009.
8. Li, Ruonan, and Rama Chellappa. "Group motion segmentation using a spatio-temporal driving force model." Computer Vision and Pattern Recognition (CVPR), 2010 IEEE Conference on. IEEE, 2010.
9. Tran, Du, and Junsong Yuan. "Optimal spatio-temporal path discovery for video event detection." Computer Vision and Pattern Recognition (CVPR), 2011 IEEE Conference on. IEEE, 2011.
10. Wang, Xinchao, et al. "Tracking interacting objects optimally using integer programming." European Conference on Computer Vision. Springer International Publishing, 2014.
11. Bialkowski, Alina, et al. "Win at home and draw away": automatic formation analysis highlighting the differences in home and away team behaviors." Proceedings of 8th Annual MIT Sloan Sports Analytics Conference. 2014.
12. Hardoon, David R., Sandor Szedmak, and John Shawe-Taylor. "Canonical correlation analysis: An overview with application to learning methods." Neural computation 16.12 (2004): 2639-2664.
13. Kim, Kihwan, et al. "Motion fields to predict play evolution in dynamic sport scenes." Computer Vision and Pattern Recognition (CVPR), 2010 IEEE Conference on. IEEE, 2010.
14. Auto-Encoding Variational Bayes, Kingma, D. P. and Welling, M., ArXiv e-prints, arxiv.org/abs/1312.6114, (2013).

15. Vincent, Pascal; Larochelle, Hugo; Lajoie, Isabelle; Bengio, Yoshua; Manzagol, Pierre-Antoine (2010). "Stacked Denoising Autoencoders: Learning Useful Representations in a Deep Network with a Local Denoising Criterion". The Journal of Machine Learning Research. 11: 3371-3408.

(2) Principal Aspects

Various embodiments of the invention include three "principal" aspects. The first is a system for prediction of movements and, more specifically, to a system for implicit prediction of movements of an object of interest with an autoencoder. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
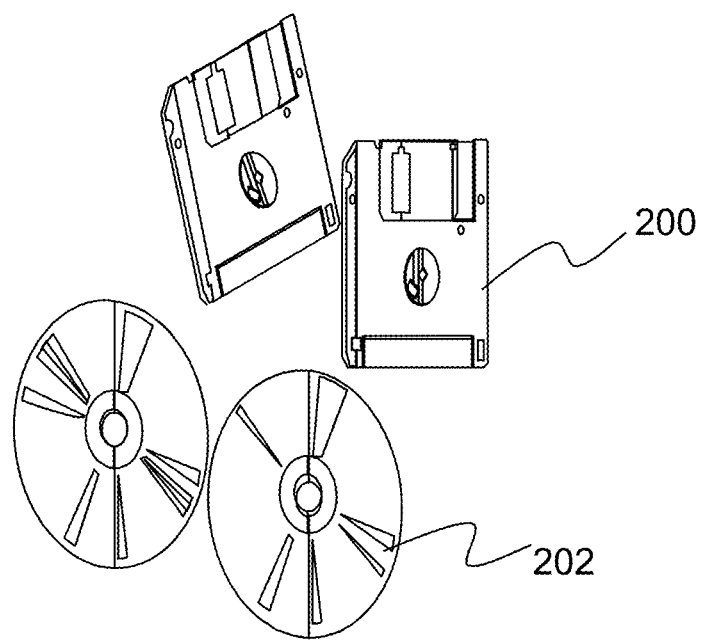
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure describes, for some embodiments, a method to implicitly predict multi-agent movements in scenarios for which a perfect tracking of each agent at each time step is not known but the overall formation of the group or an opposing group is known. Such a task may require a good understanding of adversarial, tactical, and/or strategic behavior, such as in sports. For example, for some sports related embodiments, a new challenge is to automatically provide tactical feedback to coaches, players, and/or spectators in real-time. Such high level analyses are typically complex, so a team's performance typically relies heavily on the skill set of coaches who can oversee the game.

Various techniques described in this disclosure automate the tactical analysis. Tactical analysis in multi-agent systems breaks down into two general tasks: feature representation, and the pattern recognition paradigm. Both of these tasks go hand-in-hand. Even with good pattern recognition performance, overall performance of a system may still be poor if the relevant information is not encoded in the feature representation. This disclosure addresses both tasks and justifies the example algorithms used for each task.

For feature representation, in some embodiments, an image-based representation of the player movements relative to the ball over the full duration of each shot-clock is first created. Then one or more autoencoders are used to learn an implicit relationship between a first formation (e.g., an offensive or defensive formation) and a second formation (e.g., a responsive defensive or offensive formation) depicted in the image domain. With this technique, an implicit relationship is learned between a first formation and a second formation (e.g., offensive and defensive formations). Experiments with the basketball dataset (e.g., data from the 2012-2013 NBA season) demonstrate prediction of an adversary team silhouette (e.g., representations of actions taken based on tactics and a first team's formation and/or formation activity) throughout the duration of a shot-clock.

A purpose of some embodiments of this disclosure is to exploit the high level semantics in adversary team behavior and to use this information to make a wide range of predictions. At the early stage of "machine-based" sport analytics the main focus was to improve player re-identification (See Bialkowski, Alina et al., Literature Reference No. 5), tracking (Ali et al., Literature Reference No. 2) and action and activity recognition (see Bialkowski et al., Literature Reference No. 4; and Wang et al., Literature Reference No. 10). The progress in these applications combined with the recent advances in perception has paved the way for a more complex analysis of team tactics and strategies. However the intricacy of such highly dynamic systems has led the research toward simplifying assumptions such as the independence between players (see Pellegrini et al., Literature Reference No. 3; Ali et al., Literature Reference No. 2; and Tran et al., Literature Reference No. 9).

In contrast, this disclosure describes implicit methods to model team behavior that do not use one or more of the simplifying assumptions that apply to the references above. This disclosure mainly focuses on sport analytics, but the methods and systems described herein may be applied to a variety of behaviors such as in business, commerce, human movements, manufacturing, and/or transportation. These methods and systems may also be applied in other environments where actions taken by one group, object, vehicle, or person are systematically, tactically, or strategically responded to by another group, object, vehicle, or person. Thus, although examples are provided with respect to sports, it should be understood that such examples are provided for illustrative purposes only and that the invention is not intended to be limited thereto. Further details are provided below.

(4) Specific Details of Various Embodiments

Some embodiments of this disclosure aim to address the problem of tactical analysis for the duration of each shot clock in the game of basketball. This problem is split into two tasks: 1) the feature representation, and 2) the pattern recognition paradigm. This disclosure provides novel representations (e.g., image-based representations) which when modeled with an Autoencoder provides improved results. As understood by those skilled in the art, in some embodiments, the Autoencoder is a specific specialized hardware, such as an FPGA or a computer. The system described herein, for example, is a way to provide inputs to the Autoencoder to predict the oppositions moves.

The following sections disclose an autoencoder algorithm and variations that take an image-based trajectory of a first team and predict a response (e.g., in the form of a detailed response formation and/or a silhouette of a response formation). In some embodiments, the prediction enables the home team to respond to the predicted response of an adversary visiting team. In other embodiments, the prediction provides the home team with a recommended response to an adversary team's formation. By predicting the adversary prediction, the home team may further be enabled to lure the adversary team into a trap. Before beginning to describe techniques that make predictions, the constraints in the basketball game are reviewed below.

The game of basketball consist of four quarters, the duration of each quarter is 720 seconds (12 min) leading to 2880 seconds total in each NBA match. The clock countdown starts once the player hand (from the team who has the possession) touches the ball. There are two process of timekeeping in the game; First, the game clock and second, the shot clock. Once a team has a possession they have up to 24 seconds to make the shot. The shot clock duration varies due to various reasons including rebound, crossing over the court boundaries or simply due to making the shot and any instance. Once the shot clock resets the possession of the ball changes giving the opposing team a time window of 24 seconds to make their shot. Note that given the total duration of 2880 seconds in each match and the 24 second shot clock reset, the minimum number of shot opportunities per game is 120 or 30 per quarter, but this number may be much larger in practice. In other adversarial contexts, different or additional constraints may apply, such as how quickly the persons or objects can move, the time duration, or other limitations.

Figure 3:
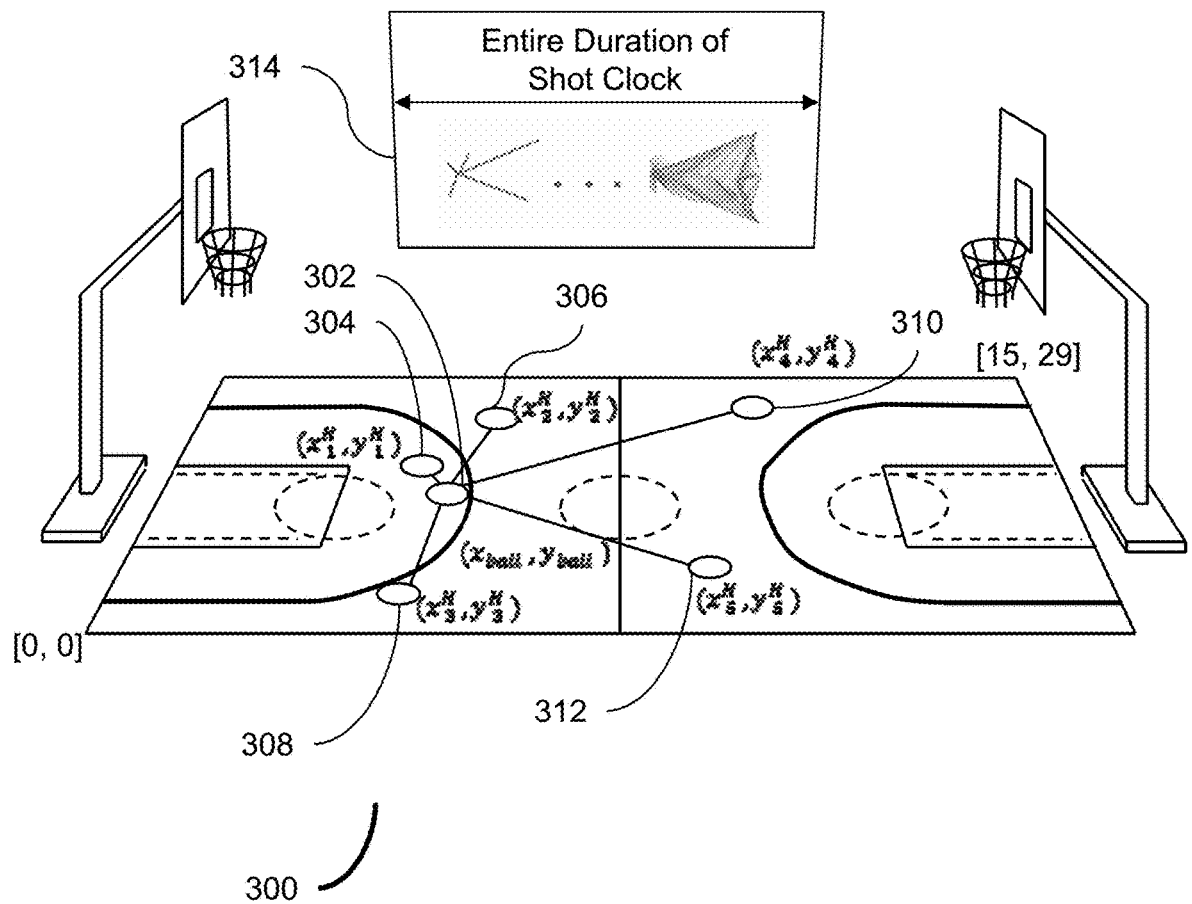
FIG. 3 is an example visualization, according to various embodiments.

In FIG. 3, player connections are shown for a home team in an example visualization 300 (e.g., a visual image of a basketball court and a predicted formation determined while a shot clock is measuring time). FIG. 3 includes representations for a ball 302, players 304, 306, 308, 310, and 312. FIG. 3 further includes an image 314 that includes a representation of the player formations for a first team on the left, and a representation of the responsive player formation of a second team on the right. In some embodiments, when the feature is computed, this coordinate is transferred relative to the position of the ball such that the ball stays in the center of the feature coordinate system.

In the implicit technique, as the shot clock evolves, the star shaped figure may continue to leave its trajectory on the image plane. For example, if a star shaped figure is used to describe the team player position at a particular time. Then for multiple subsequent time frames, the star shaped figure for that time frame may be superimposed over the first figure, creating a composite image. The composite image may include all the star shaped figures for each time frame between a start time and the end of the shot-clock. This composite image may be a silhouette of a "shifted star."

In the Explicit method, each new instance within the shot clock corresponds to the sequence of relative distances in the image plane. In some embodiments, an instance may be defined as a formation derived from one image frame, which in turn may be a single image frame from a video recorded at 30 frames per second (fps).

In some embodiments, the tactical analysis applies to an "event" that is defined as the time duration between two consecutive shot clock resets. In the following subsections, the first stage of the process includes computing a tactical representation for each event. Next, the appropriate algorithm for exploiting the tactical information is applied.

(4.1) Implicit Tactical Analysis Based on Image-Based Trajectories

In some embodiments, the tactical patterns in the image domain are exploited. Specifically, an image-based representation may be created such that some or all player movements (e.g., relative to the location of the ball) get encoded in one image. There are many different ways of encoding features. The relational feature used by some embodiments of this disclosure can be used for tactical analysis, but the methods and systems of this disclosure are not limited to this representation.

Given corresponding images for each offensive and defensive pattern, deep convolutional auto-encoders are utilized to model the relationship between attack and defense formations. As shown in FIG. 4, Autoencoder Algorithm 1 describes more details at each stage of a process, according to some embodiments. In other embodiments, one or more parts of the algorithm may be removed, modified, or replaced. In some embodiments, in the first stage, the feature representation is enriched with relational features implicit in the image domain. In some embodiments, in the second stage, the relationship between movement patterns of each team is learned with an autoencoder.

As noted above, FIG. 4 is an illustration of Autoencoder Algorithm 1, some or all of which may be used for predicting a response for adversarial or other movements according to various embodiments. In particular, Autoencoder Algorithm 1 predicts a silhouette-based response for adversarial movements.

(4.2) Tactic Prediction with Convolutional Deep Autoencoders

Let I and J be the corresponding images for the overall formations (e.g., the pattern created by the movement of the star shaped pattern over the course of a shot clock) of the 'home' and 'adversary' teams. Each image of a formation (e.g., a trajectory) is generated over the entire duration of a shot clock. Each team may include one or more members (e.g., one or more objects of interest), and the image of the formation may track relative movements of the members of the team to each other, an object such as a ball, and/or relative to a fixed location in the environment, such as a point on a basketball court. In other embodiments, the team members may comprise one or more of persons, vehicles, drones, or other objects.

An objective, according to some embodiments, is to estimate the formation of the 'home' team, based on the formation of the 'adversary' team. Another objective, according to some embodiments, is to estimate the formation of the 'adversary' team based on the formation of the 'home' team. These objectives may be used to predict a second team's response (e.g., an opposing team's response) to a first team's formation, whether offensive or defensive, which can then allow the players of the first team to anticipate and respond to the predicted formation of the opposing team. The predicted formation may be the expected movements of the opposing team made based on tactics to give them an offensive or defensive advantage based on the first team's positions and/or movements (e.g., the predicted tactical response).

Recent advances in deep learning are utilized to design a deep convolutional neural network (CNN) which receives I and generates an estimate of the image J. To achieve this goal, two convolutional autoencoders are utilized for Is and Js, which are the input and output of the autoencoders. For each image I there is a unique J image as an output.

Let $f(I_n)$ and $g(J_n)$ be the encoders for Is and Js, respectively. Also, let $\phi(\cdot)$ and $\psi(\cdot)$ be the corresponding decoders for $f(\cdot)$ and $g(\cdot)$, such that $\phi(f(\cdot)) \approx id$ and $\psi(g(\cdot)) \approx id$. This implies that if encoding is applied by decoding, the original signal should be obtained. In an embodiment, the autoencoders are trained jointly by minimizing the following objective function:

$$\arg\min_{f,g,\phi,\psi} \Sigma_n \|\phi(f(I_n)) - I_n\|_2^2 + \|\psi(g(J_n)) - J_n\|_2^2 + \lambda \|f(I_n) - g(J_n)\|_2^2$$

In the function above, $\lambda$ is a regularization parameter. Note that, the first and second terms are enforcing that $\phi(f(\cdot)) \approx id$ and $\psi(g(\cdot)) \approx id$, while the third term enforces that the encoded features for corresponding offensive and defensive formations should sit close to each other. In other words, $f(\cdot)$ and $g(\cdot)$ could be considered as nonlinear embedding functions which embed Is and Js, such that $I_n$ and $J_n$ are ideally mapped to the same point. Next, the CNN is built by taking the encoder part of the 'home' autoencoder, f(·) (e.g., a first team autoencoder), and adding the decoder part of the 'adversary' autoencoder, ψ(·) (e.g., a second team autoencoder), on top of it. This section describes the structure of the autoencoder. For typical applications, the same image is used for an input and an output to make the machine (e.g., the CNN, an autoencoder) learn how to produce the same image. In various embodiments of the current disclosure, a different image (e.g., an adversary formation) is used for the output to make the machine learn the mapping from a home team formation to an adversary team formation.

In this manner, the formation prediction for $J_n$ is obtained from $\hat{J}_n = \psi(f(I_n))$. Finally, the CNN is fine-tuned over the training data. A summary of the method is shown in FIG. 5, which is described in greater detail below.

Figure 5:
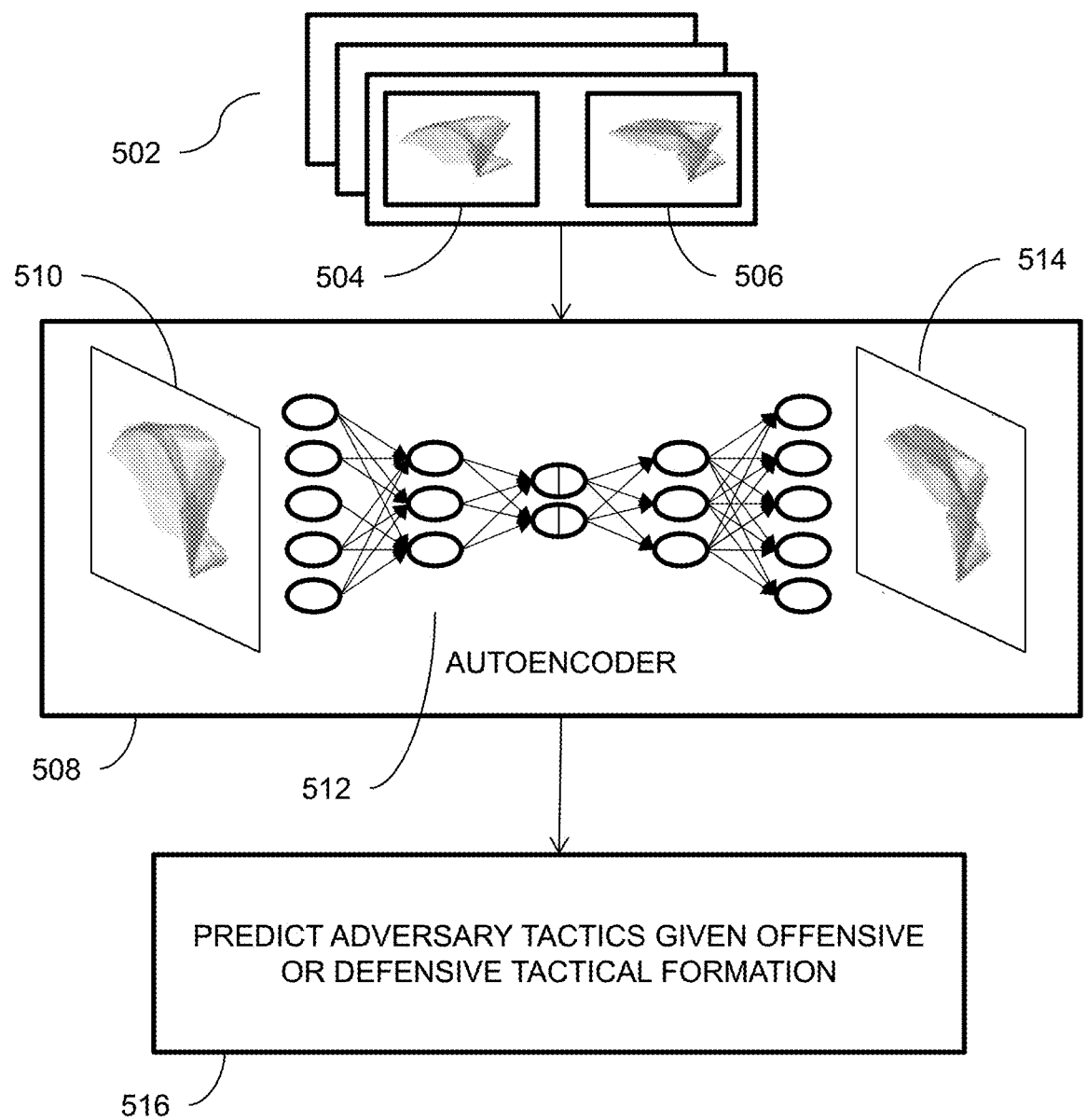
FIG. 5 is a flowchart illustrating an implicit method for tactical analysis, built around an Autoencoder according to various embodiments.

FIG. 5 is a flowchart illustrating an implicit method, according to various embodiments. Given the image-based trajectory of both offensive and defensive teams, a two-layer autoencoder/decoder may be constructed. The latent representation can then be made to be the same for the visual appearances of both offensive and defensive team formations (e.g., the home team formation and the adversary team formation). The latent representation is a rich representation that has half of its information from a home team formation and the other half from an adversary team formation. "Made to be the same" refers to making the rich latent space the same for both the encoder and decoder (e.g., see the center illustration of autoencoder 512 of FIG. 5). An autoencoder, is for example, an artificial neural network used for unsupervised learning of efficient codings. The aim of an autoencoder is to learn a representation (encoding) for a set of data, typically for the purpose of dimensionality reduction. Recently, the autoencoder concept has become more widely used for learning generative models of data (see, for example, Literature Reference nos. 14 and 15).

With that, given one team's tactical movements that occur throughout the shot clock duration (e.g., the cumulative image of movements made throughout a shot clock), a prediction for an opposing team reaction can be made. In other embodiments, different periods may be considered, such as from one frame to another or from one group of frames to the next frame.

Data representation 502 represents multiple sets of pairs of image representations for a first team and a second team, each of the pairs corresponding to a particular shot clock duration. Data representation 502 is used in a training system 508 for training autoencoder 512, with 510 representing a first team's formation data for a given shot clock (e.g., a first team's trajectory that occurred during the event) and 514 representing the second team's formation data for the given shot clock (e.g., the second team's trajectory that occurred during the event). Once trained, the autoencoder 512 (e.g., a predictive autoencoder) may be used in operation 516 to predict an adversary's tactics given an offensive or defensive tactical formation of an opposing team (e.g., a 'Home Team').

(4.3) Dataset

A dataset for this disclosure was obtained from STATS SportsVU tracking data for the 2012-2013 NBA season. The SportVU dataset was obtained from visual data collected from six cameras installed on top of the basketball arenas. The available information contains player's position, ball position, team IDs and player IDs, game clock, shot clock, quarter indication and more for 663 games across 13 NBA teams with the frequency of 25 frames per second. In the experiments, player position, ball position, shot clocks, and the score were used.

(4.4) Feature Representation

Given an objective for some embodiments of high level semantic analysis, feature extraction plays an important role in the sense that it often contains high level semantics encoded in each sample. With the assumption for some embodiments that a team's tactics are revealed over the entire duration of a shot clock (which is a maximum of 24 second), the feature representation should contain the player and the ball movements encoded for the entire duration between two consecutive shot clock resets. Given the importance of ball position and its relative distance and orientation to each player, the features are constructed such that it contains relative distance and orientation of each player with respect to the ball.

In some embodiments of implicit tactical analysis, a line is drawn connecting each player to the ball to create a star shaped pattern (e.g., as shown in FIG. 3) for each snapshot of the data. Next, by overlaying the updated pattern throughout the entire duration of a shot clock, an image is created for each pair of offensive and defensive formations that correspond to each shot clock. FIG. 3 shows the initial pattern on the left side of image 314 and the completed pattern at the end of the event (e.g., at the end of a shot clock duration) on the right side of image 314. Each event results in a unique image-based representation of a formation as it evolved over the course of a shot clock, which can then be used as an input to an autoencoder.

Figure 6:
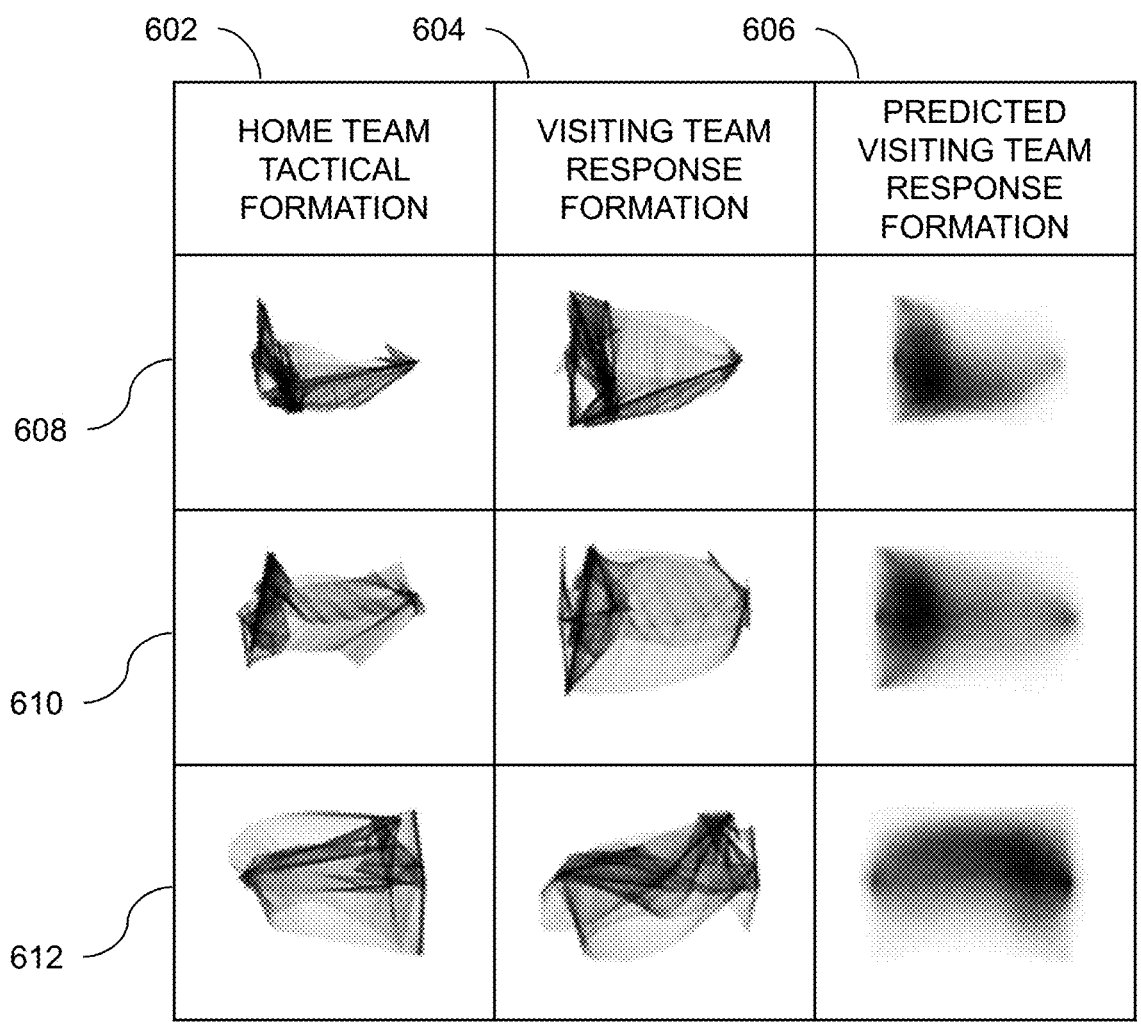
FIG. 6 illustrates implicit predictions of team formations, according to various embodiments.

FIG. 6 shows an implicit prediction of team formation throughout the shot clock. The first column 602 includes the observation of the home team formation, and the task is to predict the visitor's team formation (e.g., the adversary or opposing team's formation) throughout the corresponding shot clock. The actual visiting team formation is shown in the second column 604. The third column 604 shows the generated image from the autoencoders 512. Row 608, row 610, and row 612 each illustrate performance of the system for a given input formation, according to an embodiment.

(4.5) Tactical Analysis

This disclosure describes methods and systems for automatically generating player movements using autoencoders. Some examples are shown in FIG. 6 where the first column 602 is the input home team tactical formation, the second column 604 is the desired target response representing an adversary team's actual tactical formations, and the third column 606 shows the output of the autoencoders (e.g., the autoencoder 512). By predicting the adversary team's movements, information may be provided to the home team that provides a tactical advantage.

The term "home team" is not restricted to a "home team" that is playing or based in its own home court, arena, stadium, or territory, but instead extends to referring to a first team that is playing at its own location or any other location. "Adversary Team" and "Visiting Team" are similarly not restricted to a team that is playing at another team's home court, arena, stadium, or territory, and instead simply refer to a second team that is cooperating with or competing against the first team.

As mentioned above, two convolutional deep autoencoders are first utilized and trained separately with each autoencoder being associated with one team. For some embodiments, the only constraint is that their corresponding encoded representations of each team formation should be identical. Next, the CNN is built by taking the two layer encoder part of the 'home' autoencoder and adding the two layer decoder part of the 'adversary' autoencoder on top of it (e.g., as shown in FIG. 512 of FIG. 5). The CNN may then be fine-tuned (e.g., by manually or automatically optimizing the autoencoder parameters) over the training data.

(4.6) Control of A Device

Figure 7:
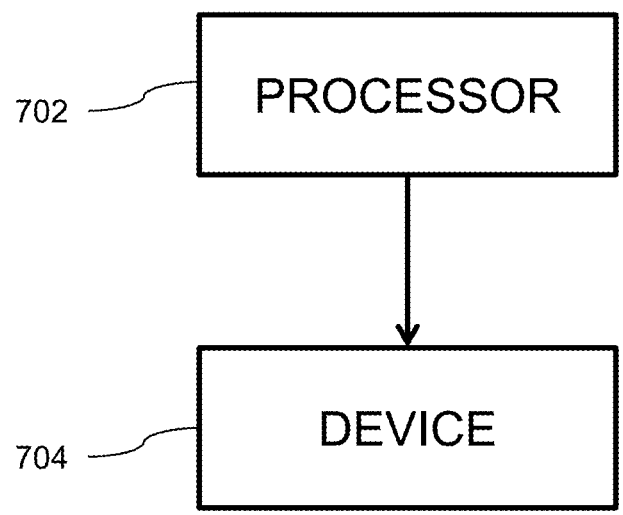
FIG. 7 is a block diagram depicting control of a device, according to various embodiments.

As shown in FIG. 7, a processor 104 may be used to control a device 704 (e.g., a mobile device display, a virtual reality display, an augmented reality display, a computer monitor, a motor, a machine, a drone, a camera, etc.) based on the prediction of movements (e.g., adversary movements) described above. The control of the device 704 may be used to transform the prediction data regarding adversary movements into a still image or video representing the predicted movements. For example, the predicted movements may be shown on a representation of the area where movement is predicted to occur, such on the court shown in FIG. 4. In other embodiments, the device 704 may be controlled to cause the device to move or otherwise initiate a physical action based on the prediction. For example, pointing commands can be sent to video cameras to cause the video cameras to re-orient and/or focus on the area where movement is predicted to occur to improve the image that may be captured when the movement occurs.

In some embodiments, an image representing predicted movements may be overlaid on top of a view of a real-world environment (e.g., via augmented reality). For example, a player, coach, or spectator may be shown an image representing the predicted movement or predicted future location of members of an opposing team based on their current formation. The image (e.g., circles representing predicted positions) may be overlaid on top of a view of the basketball court creating a composite view of the real world and a computer-generated image. In some embodiments, an image representing recommended movements for a player or coach's own team may be overlaid on top of a view of a real-world environment to provide a recommended response to an adversary's formation and/or movements.

In some embodiments, a drone may be controlled to move to an area where predicted events are going to occur or where such predicted events can be viewed. In yet some other embodiments, a camera may be controlled to orient towards where predicted events are going to occur. In other words, actuators or motors are activated to cause the camera (or sensor) or other device to move and change its field of view (e.g., orientation) to encompass or otherwise be directed towards the location where the predicted events are going to occur.

Figure 8:
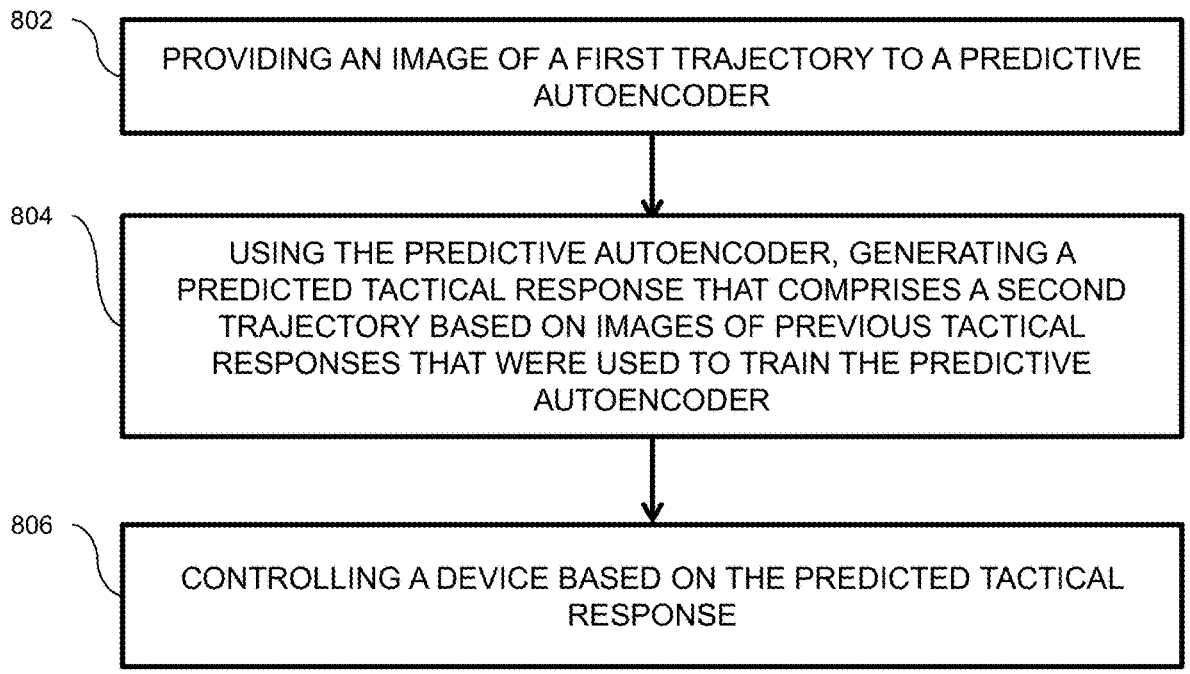
FIG. 8 a flowchart illustrating operations for predicting movement of an object, according to various embodiments.

FIG. 8 is a flowchart illustrating operations for predicting movement of one or more objects of interest, according to an embodiment. In operation 802, an image of a first trajectory is provided to a predictive autoencoder. In operation 804, a predicted tactical response is generated using the predictive autoencoder, the predicted tactical response comprising a second trajectory based on images of previous tactical responses that were used to train the predictive autoencoder. In operation 806, a device is controlled based on the predicted tactical response.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for implicitly predicting movement of an object, the system comprising:
   one or more processors and a memory, the memory being a non-transitory computer-readable medium having executable instructions encoded thereon, such that upon execution of the instructions, the one or more processors perform operations of:
   training a predictive autoencoder by providing the predictive autoencoder with data comprising multiple events, each event comprising an image of a first team trajectory that occurred during the event and an image of a second team trajectory that occurred during the event, such that a two-layer autoencoder/decoder is constructed to generate a latent representation that is formed from half of the image of the first team trajectory and half of the image of the second team trajectory;
   providing an image of a first trajectory to the predictive autoencoder;
   using the predictive autoencoder, generating a predicted tactical response that comprises a second trajectory based on images of previous tactical responses that were used to train the predictive autoencoder; and
   controlling a device based on the predicted tactical response.

2. The system of claim 1, wherein the first trajectory is for a first object that comprises one of a person or a vehicle.

3. The system of claim 1, wherein the first trajectory is for a first team comprising two or more members.

4. The system of claim 1, wherein the predictive autoencoder comprises a convolutional neural network.

5. The system of claim 4, wherein the convolutional neural network comprises an encoder part of a first team autoencoder and a decoder part of a second team autoencoder.

6. The system of claim 5, wherein the one or more processors perform operations of jointly training the first team autoencoder and the second team autoencoder by minimizing an objective function.

7. The system of claim 1, wherein the device comprises a display.

8. The system of claim 1, wherein the device comprises at least one of a drone, a vehicle, and a motor.

9. A computer program product for implicitly predicting movement of an object, the computer program product comprising:
   a non-transitory computer-readable medium having executable instructions encoded thereon, such that upon execution of the instructions by one or more processors, the one or more processors perform operations of:
   training a predictive autoencoder by providing the predictive autoencoder with data comprising multiple events, each event comprising an image of a first team trajectory that occurred during the event and an image of a second team trajectory that occurred during the event, such that a two-layer autoencoder/decoder is constructed to generate a latent representation that is formed from half of the image of the first team trajectory and half of the image of the second team trajectory;

providing an image of a first trajectory to the predictive autoencoder;

using the predictive autoencoder, generating a predicted tactical response that comprises a second trajectory based on images of previous tactical responses that were used to train the predictive autoencoder; and controlling a device based on the predicted tactical response.

10. The computer program product of claim 9, wherein the first trajectory is for a first object that comprises one of a person or a vehicle.

11. The computer program product of claim 9, wherein the first trajectory is for a first team comprising two or more members.

12. The computer program product of claim 9, wherein the predictive autoencoder comprises a convolutional neural network.

13. The computer program product of claim 12, wherein the convolutional neural network comprises an encoder part of a first team autoencoder and a decoder part of a second team autoencoder.

14. The computer program product of claim 13, wherein the one or more processors perform operations of jointly training the first team autoencoder and the second team autoencoder by minimizing an objective function.

15. The computer program product of claim 9, wherein the device comprises a display.

16. The computer program product of claim 9, wherein the device comprises at least one of a drone, a vehicle, and a motor.

17. A computer implemented method for implicitly predicting movement of an object, the method comprising an act of:

causing one or more processors to execute instructions encoded on a non-transitory computer-readable medium, such that upon execution, the one or more processors perform operations of:

training a predictive autoencoder by providing the predictive autoencoder with data comprising multiple events, each event comprising an image of a first team trajectory that occurred during the event and an image of a second team trajectory that occurred during the event, such that a two-layer autoencoder/decoder is constructed to generate a latent representation that is formed from half of the image of the first team trajectory and half of the image of the second team trajectory;

providing an image of a first trajectory to the predictive autoencoder;

using the predictive autoencoder, generating a predicted tactical response that comprises a second trajectory based on images of previous tactical responses that were used to train the predictive autoencoder; and controlling a device based on the predicted tactical response.

18. The method of claim 17, wherein the first trajectory is for a first object that comprises one of a person or a vehicle.

19. The method of claim 17, wherein the first trajectory is for a first team comprising two or more members.

20. The method of claim 17, wherein the predictive autoencoder comprises a convolutional neural network.

21. The method of claim 20, wherein the convolutional neural network comprises an encoder part of a first team autoencoder and a decoder part of a second team autoencoder.

22. The method of claim 21, wherein the one or more processors perform operations of jointly training the first team autoencoder and the second team autoencoder by minimizing an objective function.

* * * * *